UNITED STATES PATENT OFFICE.

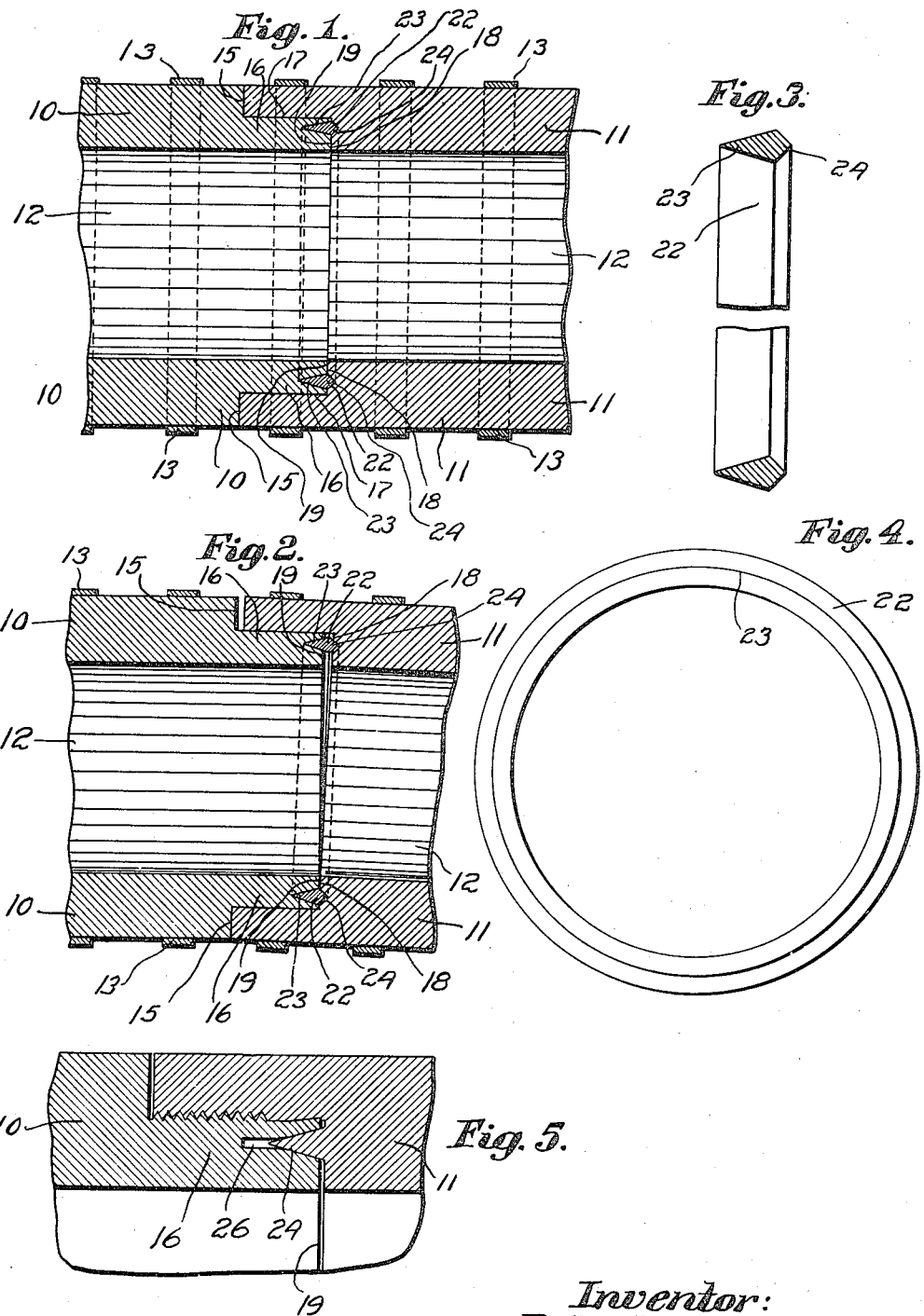

ROBERT E. HORTON, OF ALBANY, NEW YORK.

PIPE-JOINT.

1,272,267.　　　　　Specification of Letters Patent.　　Patented July 9, 1918.

Application filed August 11, 1917. Serial No. 185,768.

*To all whom it may concern:*

Be it known that I, ROBERT E. HORTON, of 57 North Pine avenue, city of Albany, county of Albany, and State of New York, have invented an Improvement in Pipe-Joints, of which the following description, in connection with the accompanying drawing, is a specification, like characters on the drawing representing like parts.

This invention relates to pipe joints and pertains more particularly to joints or couplings for conduits, mains and the like. It is especially applicable to wood stave pipe as well as to pipe of any character adapted to be built in sections or lengths to be joined and sealed together permanently. It is also especially adapted for use under relatively high pressures, both gaseous and fluid, under conditions where it is desirable or necessary that a pipe be without laterally projecting flanges or the like.

In order to illustrate my invention I have shown in the accompanying drawing one embodiment thereof wherein:

Figure 1, is a longitudinal section through a portion of a wood stave pipe and the joint of my invention therebetween.

Fig. 2, is a similar view to the above and illustrates a bend or deflection between sections of said pipe.

Figs. 3 and 4, are a vertical section and an end elevation respectively of a metal wedge or wedging ring described herein.

Fig. 5, is an enlarged sectional detail of a modification hereinafter described.

The terms employed herein are used in the generic and descriptive sense to designate elements of the invention rather than to impose limitations thereupon.

In the drawing, 10 and 11 designate portions of sections of pipes composed of the wood staves 12 clamped tightly together by the bands 13 of metal and illustrates what is known as machine banded wood stave pipe frequently employed as a conduit or flume between the head waters or a dam and the penstock of a turbine water wheel or the like. Therefore at all times subjected to a considerable hydraulic head great lateral pressure is directed against the interior walls so that in order to withstand the same said pipe and all joints must be strong, rigid and water tight. Where such heavy duty pipe is non-continuous or built in sections or lengths it is extremely difficult to make a tight joint between sections without resorting to the use of the conventional flanges and yielding packing materials.

Referring to Figs. 1 and 2, the section 10 is provided with the shoulder 15 and the reduced extension 16 known as a spigot, the latter being adapted to fit within the counterbore 17 on the section known as the bell. The bell has a shoulder 18 to abut against the flat face 19 at the end of said spigot.

This construction applies to pipes of all characters whether of metal, wood stave pipe, or what is known as bored pump logs. The object being to have a pipe simple in construction and uniform upon its outer periphery, the sections of which are joined by the insertion of a reduced portion on one section within a correspondingly counterbored portion on the mating or associated section to form overlapping parts. It is essential that pressure tight joints of this nature be extremely simple, quickly assembled, cheap, and highly efficient. Also it is essential to the success of the joint that the present known practice be closely adhered to in order to avoid destruction or damage to the joint or pipe whenever it is disconnected by others than the original assemblers and to enable the invention to be applied to such pipes now in use. In its application my invention contemplates separation and assembling of the joint by a relatively axial movement of the sections as now practised.

By enlarging the spigot 16 so that it is slightly larger in diameter than the counterbore 17 and thus compel a drive fit between the two does not overcome the tendency toward leaking joints. In this case the enlarged spigot will often spread the staves and open up the joints therebetween or will split the pipe.

Therefore in the application of my invention, I utilize the spigot and bell form of coupling associated with a wedging or peripheral distorting member adapted to coöperate with the shoulder 18 and the face 19 on the bell 11 and spigot 10 respectively.

In its broad application such peripheral distorting member may be of any shape or construction best adapted to accomplish the objects of my invention by designing the member so as to distort one or the other of the overlapping portions against the portion associated therewith.

Therefore, I have illustrated in Figs. 3 and 4, a metal ring like member 22 having a substantially tapering wedging spigot distorting or deflecting portion 23 and a blunt bell engaging and indenting portion 24. In the cross section, Fig. 3, said portion 23 is a relatively long and slim triangular wedge with a more obtuse triangular wedge opposite thereto. While this latter is a preferred form it will be readily apparent to any one skilled in the art that other shapes capable of performing the same functions are within the scope of the invention and the application thereof.

Fig. 1, illustrates the member 22 so applied that the portion 24 engages the shoulder 18 at a point nearer the counterbore 17 and removed from the inner periphery or bore of the pipe. Therefore the portion 23 of said member engages the face 19 at a point near the outer periphery of the spigot and the latter is then forced toward the said shoulder 18.

As the spigot end engages the portion 23 the former is split by the latter as it is forced into the bell until the full length of the wedge becomes embedded in the end of said spigot distorting or expanding the outer periphery thereof against the counterbore 17 and wedging the spigot tightly thereagainst. At the same time the portion 24 becomes embedded into the shoulder 18 to substantially the full length thereof.

The action of the portion 24 therefore is to maintain the normal contour of the bell 17 and prevent opening the joints between the staves 12 by means of the locking arrangement when said portion is indented into the spigot while only the outer periphery of the inner end of the spigot 16 is distorted sufficiently to compress the wood fibers against the unyielding bell or counterbore. The entire member 22 performs the same useful and desirable function as the bands 13 thereby strengthening the joint. In addition, any fluid or gaseous bodies passing between the shoulder 18 and the face 19 cannot escape farther than the member 22 which forms with its embedded ends, a pressure resisting diaphragm or wall.

Fig. 1, illustrates a pipe having the sections in axial alinement while Fig. 2, further shows the advantages and functions of the member 22 by the application thereof to a bend or a deflected joint wherein the latter is of the same construction but that one side only of the face 19 is in contact with the shoulder 18 while on the opposite side they are separated. In any event the member 22 operates as previously described except that where the said shoulder 18 and face 19 is separated the portions 23 and 24 do not penetrate the parts quite as deeply. The wood of the spigot however is split and deflected with great force against the said counterbore producing a joint that is just as effective as though the sections of the pipe were in exact axial alinement.

In Fig. 5 I have illustrated the end of the spigot as being provided with a groove 26 near the outer periphery and adapted to receive therein the wedge or portion 23. This construction may be desirable in wood stave pipe or in installations where the pipe is of a material other or harder than wood. The application and operation of the wedge or distorting ring 22 is the same in either construction. Likewise the very blunt end 24 may be inserted into the material of the bell previously to its being forced into the spigot face or said portion 23 may in some cases be formed integral with the shoulder 18 in the same relative position as illustrated by the ring in Fig. 1.

A wedge or wedging ring or member constructed substantially as herein illustrated or described will not skew when driven into the wood and will penetrate equally well in wood having knots on the surface of the face to be penetrated, will not crimp when driven and makes a pressure tight joint. Also in the case of wood stave pipe or the like a narrow band of metal for the member 22 can be employed so as to cause less interference with saturation of the wood, which is essential to the durability thereof.

I have described herein one embodiment of my invention; but it is to be understood that the latter is not essentially limited to the specific details of construction and organization of said embodiment, since the same may be varied without departing from the proper scope of the claims.

Claims.

1. In a pipe joint, the combination of two pipe members having telescoping ends fitting one within the other and an annular member adapted to indent one telescopic end and to penetrate the other telescopic end to force the latter into engagement with the former.

2. As a new article of manufacture, an annular member having dissimilar wedging portions cross sectionally thereof to form distorting wedges for use between the joined ends of pipes to seal the joint between the same.

3. As a new article of manufacture, an annular member having dissimilar wedging portions cross sectionally thereof to form a distorting wedge and pipe indenting portion for use between the joined ends of pipes to seal the joint between the same.

4. In a pipe joint, the combination of two pipe members having overlapping ends and whereof one is made upon its end with an annular wedge receiving recess adjacent to the outer periphery of the overlapping end, and a wedge ring having its sharp end forced into said recess by the other member to deflect an annular portion of said recessed member against said other member to close the joint between the two members.

5. In a pipe joint, the combination of two pipe members having overlapping ends and with a wedge ring having its sharp end forced into one member by the other member to deflect an annular portion of the penetrated member against said other member to close the joint between the two members.

6. In a pipe joint, the combination of two pipe members one of which is provided with a reduced portion between two transversely disposed annular faces and the other member is provided with a corresponding counterbore between transverse annular faces, and a wedging ring having its sharpened edge forced into the annular face on one of said pipe members at a position near the other member and indented slightly in the annular face abutting the penetrated face to distort said penetrated portion to close the joint between the two pipe members.

7. In a pipe joint, the combination of two pipe members having overlapping ends and abutting faces, and a wedging member adapted to split one of said ends about its face to force said end against the overlapping end on the coöperating pipe member.

8. In a pipe joint, the combination of two pipe members having abutting faces and overlapping ends, and a ring having one edge thereof adapted to split one abutting face and indent the opposite abutting face to distort one of said overlapping ends against the base of the opposed overlapping end to close the joint formed thereby.

In testimony whereof, I have signed my name to this specification.

ROBERT E. HORTON.